United States Patent [19]

Malminen

[11] Patent Number: 5,086,654
[45] Date of Patent: Feb. 11, 1992

[54] VARIABLE AREA FLOWMETER

[75] Inventor: Kari Malminen, Lithonia, Ga.

[73] Assignee: Th-Flow, Inc., Lithonia, Ga.

[21] Appl. No.: 583,726

[22] Filed: Sep. 17, 1990

[51] Int. Cl.⁵ .................................................. G01F 1/22
[52] U.S. Cl. .................................................. 73/861.58
[58] Field of Search ............ 73/861.53, 861.54, 861.57, 73/861.58

[56] References Cited

U.S. PATENT DOCUMENTS

| 2,377,861 | 6/1945 | Brewer | 73/861.57 |
| 3,805,611 | 4/1974 | Hedland | 73/861.58 |
| 4,389,901 | 6/1983 | Lake | 73/861.58 |

FOREIGN PATENT DOCUMENTS 687835  3/1965  Italy ................... 73/861.58

Primary Examiner—Herbert Goldstein
Attorney, Agent, or Firm—Hopkins, Thomas, Kerr

[57] ABSTRACT

A variable area flowmeter (10) for monitoring the rate of flow of a cooling and lubricating medium about a pump seal, having a transparent flow tube (27) through which the flow passes. An adjustable metering member (38) is mounted within the flow tube (27) and supports a spring biased float (46) which is movable back and forth along the length of the flow tube (27). A cleaning ring (52) is affixed to the closed end (50) of the float (46) and is in tight frictional contact with the inner wall (29) of the flow tube (27). The cleaning ring (52) scrapes the inner wall (29) of the flow tube (27) to remove any accumulated dirt and debris from the inner wall (29) of the flow tube (27).

11 Claims, 2 Drawing Sheets

VARIABLE AREA FLOWMETER

FIELD OF THE INVENTION

The present invention relates generally to flowmeters for measuring the rate of flow of a liquid medium. In particular, the present invention relates to a flowmeter having means for clearing from the flow tube of the flowmeter dirt and debris which has accumulated in the flow tube as a result of the passage of a medium therethrough.

BACKGROUND OF THE INVENTION

In many manufacturing plants or other facilities, such as papermills, where large pumps are run continuously to convey a process liquid for a mixing process, cooling and lubricating mediums such as water or oil are often used to cool and lubricate the mechanical seals or packings surrounding the drive shafts of the pumps. The heat generated due to friction of the drive shaft with the sides of the impeller housing and the high temperature to which the process liquid is generally heated can cause the failure of the seals, which can result in expensive pump down time.

When the seal fails, the process liquid can leak out of the apparatus or the cooling water will leak in, mixing with the process liquid. Such leaks waste water and waste energy as the mixing of cooling water with the process liquid lowers the temperature of the process liquid, requiring additional energy and thus additional expense to be expended to maintain the temperature of the process liquid at the proper processing level. It is therefore highly desireable to detect a breach of the seal of a pump as early as possible so that the seal can be repaired or replaced, thereby restoring the efficiency of the process and prolonging the life of the pump.

In general, flowmeters are used to monitor and regulate the flow of sealing water about a pump seal. Flowmeters measure the pressure and rate of flow of the sealing water thereby to provide an indication of the integrity of the pump seal. If the flow increases and pressure drops, it is an indication that the sealing water is leaking into the process liquid. If the flow drops and pressure rises, it is an indication of a leak of the process liquid out of the process. Thus, flowmeters provide an indication of the incipient failure of the pump seal.

However, the water used to cool and lubricate pump seals in most processing plants is generally waste or river water which has a considerable amount of dirt and other impurities in it. As a consequence, this dirt and grime tends to accumulate within the flow tube of the flowmeter. This accumulation of dirt clouds the flow tube and restricts the flow through the flow tube, making it difficult to read and take accurate measurements of the rate of the flow.

Flowmeters having a cleaning function for cleaning the flow tube of the flowmeter have been developed. Such flowmeters generally include a movable float mounted on a conically shaped rod extending completely along the length of the flow tube. However, the cleaning function of these conventional flowmeters only takes place in a section of the flow tube between the zero indicator and the float which gives the current flow indication as the expanding diameter of the conical rod limits the travel of the float along the length of the flow tube. Consequently, there is a portion of the flow tube from which accumulated dirt and grime are not cleaned. Thus, the cleaning function performed by conventional flowmeters is incomplete and thereby fails to correct the inaccuracy of the flowmeter.

Therefore, it can be seen that a need has existed for a flowmeter which has a self-cleaning function that quickly and completely cleans the flow tube thereof of any accumulated dirt and debris. Accordingly, it is the provision of a flowmeter with an improved self cleaning function to which the present invention is primarily directed.

SUMMARY OF THE INVENTION

Briefly described, the present invention comprises a variable area flowmeter to be used as part of a regulation and maintenance system for measuring the rate of flow of a medium. In a preferred form of the invention, the flowmeter includes a housing having integrally formed therein an inlet channel and an outlet channel. The inlet channel delivers a flow of a medium into the housing while the outlet channel provides a means for permitting the medium to flow from the housing.

A transparent flow tube is linked to the inlet channel along the flow path of the medium. A scale is printed on the flow tube to provide a gauge for measuring the flow rate of the medium. An adjustable metering member is affixed to one end of the flow tube and extends partially along the length of the flow tube. The metering member supports a movable float which rides along the length of the metering member as it moves along the flow tube.

A compression spring is positioned inside the movable float and is attached to the end of the flow tube, adjacent the fixed end of the metering member. The spring biases the float toward the inlet end of the metering tube, pushing the float against the force of the flow through the flow tube.

A flow indicator ring is mounted in sliding contact inside the flow tube and moves between the free end of the metering member and the end of the flow tube. The flow indicator ring is moved along the metering tube by the force of the medium flow. The separation between the flow indicator ring and the float, as shown by the scale printed on the flow tube, indicates the flow rate of the medium.

The cleaning function of the flowmeter is carried out by the scraping motion of the float and the flow indicator ring sliding back and forth along the length of the flow tube. When there is no medium flow through the flow tube, the spring urges the float toward the opposite side of the flow tube. The float and the indicator ring scrapes any accumulated dirt and grime from the sides of the flow tube. As the medium flow is returned to the flow tube, the collected dirt and debris is washed away. Thus, the flow tube of the flowmeter is quickly and effectively cleaned by the float and the indicator ring.

DESCRIPTION OF THE PREFERRED EMBODIMENT

Figure 1:
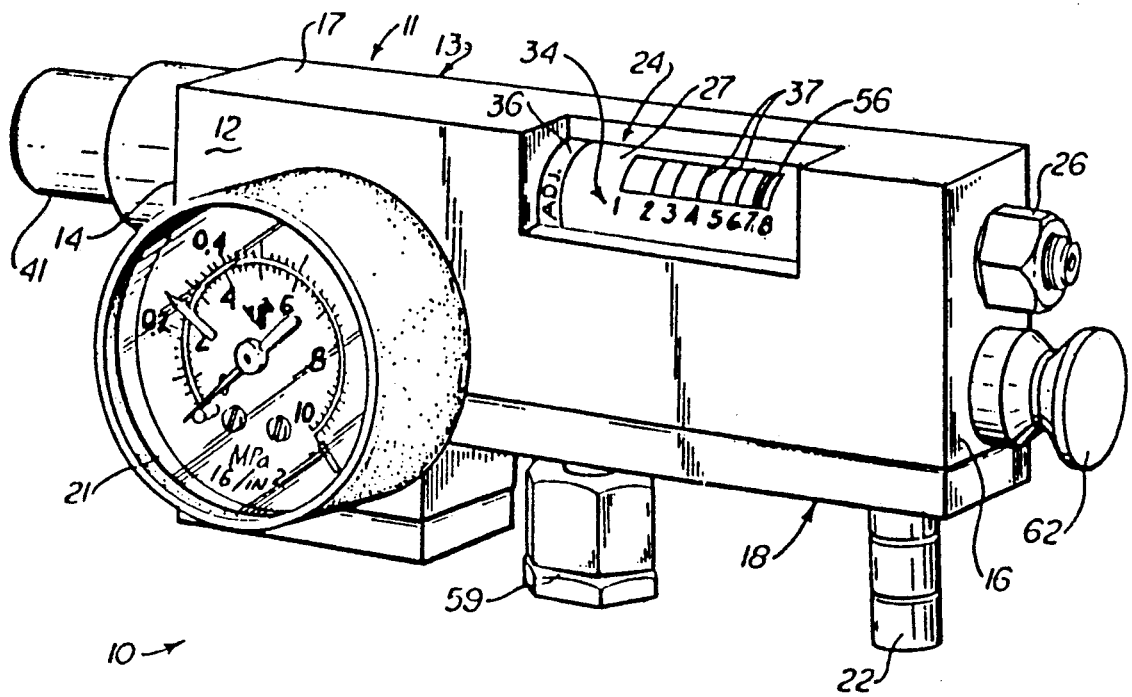
FIG. 1 is a front elevational view of the flowmeter.

Referring now in greater detail to the drawings in which like numerals indicate like parts throughout the several views, FIG. 1 illustrates a flowmeter 10 for measuring the rate of flow of a cooling and lubricating medium (not shown), such as water, oil, etc. about the seal of a conventional flow pump or the bearing of the machine. The flowmeter 10 includes a substantially rectangular housing 11. The housing 11 is typically constructed from a rigid durable material such as a hard plastic and has a front 12, rear 13, left side 14, right side 16, top 17 and a bottom 18.

Figure 2:
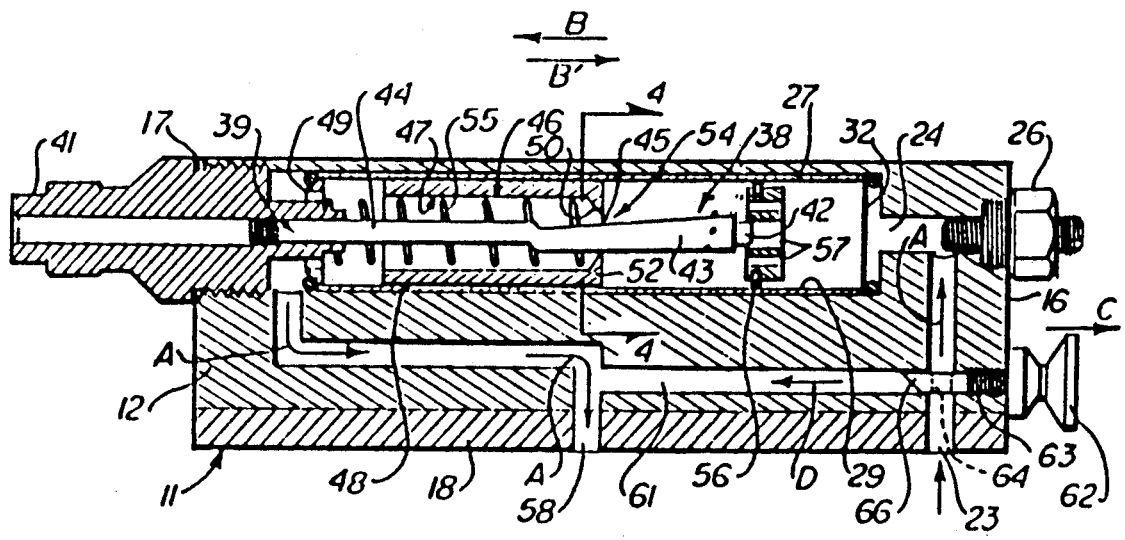
FIG. 2 is a cross sectional elevational view of the design of the flowmeter showing the paths of flow through the flow meter.

As shown in FIG. 1, a pressure gauge 21 is mounted to the front 12 of the housing 11. The pressure gauge 21, which is of conventional construction, measures the pressure of the sealing water (not shown) flowing through the flow meter 10 in both pounds per square inch (psi) and Mega-Pascals. An inlet pipe connector 22 is affixed to the bottom 18 of the housing 11 adjacent the right side 16 and extends downwardly from the bottom 18. The inlet pipe connector 22 connects the flow inlet pipe (not shown) for the sealing water to an inlet channel 23 (FIG. 2). As Fig. 2 illustrates, the inlet channel 23 extends upwardly through the housing 11, adjacent the right side 16 thereof, and connects to a horizontally aligned flow channel 24.

A flow regulation valve 26 is positioned at the right side 16 of the housing 11 and extends partially through the housing and communicates with the flow channel 24 and channel 23. The flow regulation valve 26 can be manipulated through the use of a key (not shown) inserted into the end of the flow regulation valve 26 and rotated so as to close off or open up the opening between the inlet channel 23 and the flow channel 24 in order to restrict or increase the flow of the sealing water passing from the inlet channel 23 into the flow channel 24. Thus, the amount of flow in the flow channel 24 can be quickly and easily adjusted as required.

A flow tube 27 is positioned in line with the flow channel 24 and forms a portion thereof. As shown in FIG. 1 and 2, flow tube 27 is a generally cylindrical member formed from a clear, transparent plastic and has an inner wall 29, an outer surface 31 and right and left open ends 32 and 33. A scale 34 is printed on the outer surface 31 of the flow tube 27 and provides a standard for measuring the rate of flow of the sealing water through the flowmeter 10. As seen in FIG. 1, the scale 34 has a zero point 36 and includes a series of indicator marks 37 spaced equidistantly from one another to indicate the rate of flow of the medium in, for example, gallons per minute. However, it should be understood that a separate scale can be provided that measures the flow rate of the sealing water in, for example, liters per minute. Additionally, the flow tube 27 can be provided with more than one scale, and if a different scale is needed, the flow tube 27 can simply be rotated to bring the desired scale into view.

Figure 3:
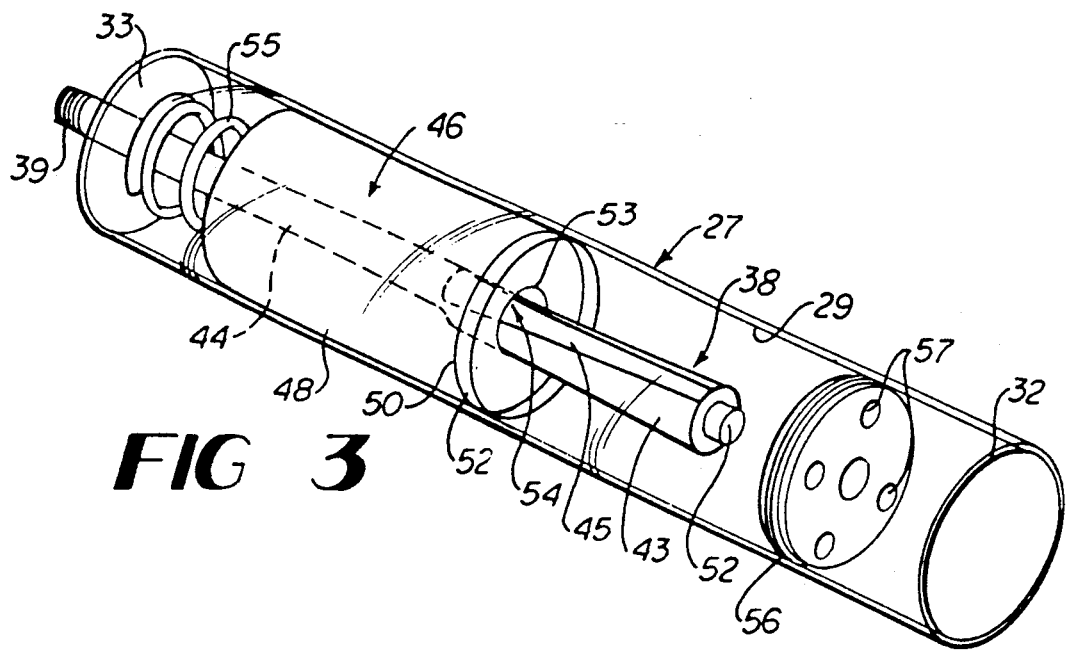
FIG. 3 is a perspective view showing the placement of the float, metering member and the flow indicator ring within the flow tube.

As illustrated in FIGS. 2 and 3, an adjustable metering member 38 is mounted within the flow tube 27. The metering member 38 is a substantially cylindrical rod having a fixed end 39 attached to an adjustment plug 41 at the left side 14 of the housing 11, and a distal end 42 extending partially along the length of the flow tube 27. The metering member 38 is constructed from a rigid, durable material, such as a plastic, and has a substantially circularly shaped portion 43 which has a flat 45 formed on one side thereof which tapers inwardly from the free end 42 of the metering member 38 to approximately half the diameter of portion 43 to form a semicircular portion 44.

Figure 4:
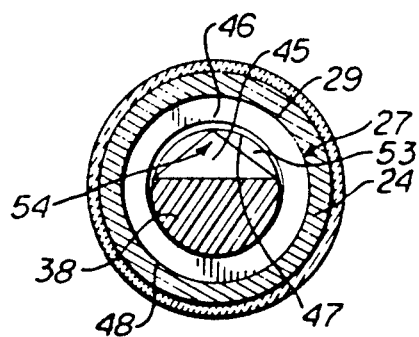
FIG. 4 is a cross-sectional view taken along lines 4—4 of FIG. 2 and showing the float mounted on the metering member and in sliding contact with the sides of the flow tube.

The metering member 38 extends through and supports a spring biased float 46 within the confines of the inner wall 29 of the flow tube 27. The float 46 is a substantially hollow cylindrical member having an inner wall 47 (FIG. 2), an outer wall 48, an open end 49 and a substantially closed end 50. As FIGS. 2 and 4 show, a cleaning ring 52 is affixed at the closed end 50 of the float 46. The cleaning ring 52 has a diameter approximately equal to the inner wall 29 of the flow tube 27 and is in frictional contact therewith. Cleaning ring 52 is carried along the length of the flow tube 27 by the movement of the float 46 along the flow tube, and scrapes any accumulated dirt or grime off of the inner wall 29 of the flow tube.

As shown in FIGS. 3 and 4, an aperture 53 is formed in the closed end 50 of the float 46. The metering member 38 extends through this aperture 53, of which engages the metering member 38 in tight frictional contact. The area between the aperture 53 and the flat 45 on metering member 38 forms a variable open flow space 54 through which the sealing water flows as it passes through the flow tube 27.

A compression spring 55 is positioned within the confines of the inner wall 47 of the float 46, and bears against the closed end 50 thereof. The spring 55 extends away from the closed end 50 of the float 46, through the open end 49 of the float and is affixed to an adjustment plug 41 adjacent the left end 33 of the flow tube 27. The spring 55 functions as a means for biasing the float along the length of the flow tube 27 in the direction of arrows B, toward the right end 32 of the flow tube 27.

As illustrated in FIGS. 2 and 3, a flow indicator ring 56 is slidably positioned within the flow tube 27. The flow indicator ring 56 is positioned between the distal end 42 of the metering member 38 and the right end 32 of the flow tube 27. Flow indicator ring 56 is a circular disk, preferably constructed from a rigid plastic, and has flow holes 57 formed therein to enable the sealing water to flow through the flow indicator ring. The flow indicator ring 56 moves back and forth along the flow tube in response to the flow of the sealing water through the flow tube 27, pushing the flow indicator ring toward the left, and in response to the float 46 engaging and pushing the flow indicator ring toward the right, which occurs when the force of spring 55 is greater than the force of the flow through tube 27.

As shown in FIG. 2, an outlet channel 58 is formed in the housing 11 and extends from the left end 33 of the flow tube 27 downwardly through the housing to an outlet pipe connector 59 shown in FIG. 1. The outlet channel 58 enables the sealing water to exit the housing. The outlet pipe connector 59 attaches to an outlet flow pipe (not shown) which delivers the sealing water to the pump seal (not shown).

A bypass channel 61 is provided at the lower portion of the housing 11, as shown in FIG. 2, and extends horizontally between the inlet and outlet channels 23 and 58. The bypass channel 61 thus links the inlet and outlet channels 23 and 58 together to provide a secondary path for the sealing water flow. A spring loaded clean-up button 62 is provided at one end of the bypass channel 61, at the right side surface 16 of the housing 11. The clean-up button 62 has a rod member 63 which extends across the inlet channel 23. An opening 64 is formed in the rod member 63 to allow the sealing water to flow through the rod member 63 along the inlet channel 23 and into the flow channel 24 during the normal operation of the flow meter. A flange 66 protrudes away from the rod member 63 and into the bypass channel 61. During a cleaning operation, flange 66 is moved toward the right as the clean-up button is pulled outwardly in the direction of Arrow C. The flange 66 covers the inlet channel 23 and directs the sealing water flow through the bypass channel 61 to the outlet channel 58, as shown by Arrow D until the clean-up button 62 is released to return the flow to its normal path of movement.

In operation of the flowmeter 10 (FIG. 1) in a sealing water monitoring and regulating system, a sealing water flow (not shown) is delivered to the flowmeter 10 by an inlet flow pipe (not shown) connected to inlet pipe connector 22. The sealing water flows into the inlet channel 23 (FIG. 2) in the direction of Arrows A and passes upwardly to the flow channel 24. The sealing water flow is regulated by the adjustment of regulation valve 26 which opens up or closes off the inlet channel 23 to adjust the flow of sealing water into the flowmeter. The sealing water flow pushes the flow indicator ring 56 into contact with the distal end 42 of the metering member 38 which retards any further movement towards the left by the indicator ring 56. At the same time, the float 46 is urged in the direction of Arrow B' toward the left by the sealing water flow, against the pressure of the spring 55.

A key (not shown) is inserted into the adjustment plug 41 and rotated in order to adjust the position of the metering member 38 (FIGS. 3 and 4), and thus the position of the flow indicator ring 56 within the flow tube 27. The metering member 38 is moved back and forth along the length of the flow channel 24 in response to the rotation of the key within the adjustment plug 41. The metering member 38 slides through the aperture 53 within the cleaning ring 52 at the closed end 50 of the float 46. The movement of the metering member 38 through the aperture 53 increases or decreases the amount of open flow space 54 between the tapered flat 45 on metering member 38 and the sides of the aperture 53, through which the sealing water flow passes. If the flow space 54 is increased, a greater amount of sealing water flows through the aperture, thus reducing the force with which the float 46 is urged toward the left. As a result, the spring 55 decompresses and urges the float 46 toward the right end 32 of the flow tube 27, gradually closing the flow space 54 and increasing the force of the sealing water flow on the float 46 until the force of the spring is equalized by the force of the sealing water flow. Thus, the position of the float 46 is set by the adjustment of the metering member 38 to a fixed point along the flow tube 27.

The position of the metering member 38 and flow indicator ring 56 is adjusted until the cleaning ring 52, affixed to the closed end 50 of the float 46, is positioned at the zero point 36 of the scale 34 printed on the flow tube 27 (FIG. 1). The separation between this zero point 36 and the flow indicator ring 56, as shown by the indicator marks 37, indicates the rate of the flow of the sealing water through the flowmeter 10.

Once enough dirt and debris has accumulated within the flow tube 27 to necessitate the cleaning of the flow tube, the clean-up button 62 is pulled outwardly from the housing 11. The flanged portion 66 (FIG. 2) at the end of rod member 63 is pulled across the inlet channel 23. The flanged portion 66 blocks the inlet channel 23 so as to prevent any further flow of the sealing water through the flow tube 27 and directs the sealing water flow into the bypass channel 61. During the cleaning operation, the sealing water flows through the bypass channel 61, in the direction of Arrow D and out the outlet channel 58 so as to maintain a continuous flow of sealing water to the pump seal without any disruptions.

In response to the cessation of the sealing water flow through the flow channel 24, the spring 55 decompresses and urges the float 46 along the length of flow tube 27. The tight frictional contact of the cleaning ring 52 with the inner side wall 29 of the flow tube 27 causes the cleaning ring 52 to engage and scrape the surface thereof. The movement of the float 46 also engages flow indicator ring 56 and urges the flow indicator ring 56 toward the right end 32 of the flow tube 27. The tight contact of the flow indicator ring 56 of the inner side wall 29 of the flow tube 27 also tends to scrape the inner side wall as the float 46 moves along the length of the flow tube 27. Thus, the dirt and debris which has accumulated along the inner side wall 29 of flow tube 27 is effectively removed by the scraping action of the cleaning ring 52 and the flow indicator ring 56 sliding along the inner side wall of the aperture 53 so that the flow space 54 remains substantially unobstructed.

At the same time, the scraping contact of the sides of the aperture 53 with the metering member 38 tends to remove any accumulated dirt from the sides of the metering member itself.

Once the float and flow indicator ring have been urged all the way to the right end 32 of the flow tube 27, the clean-up button 62 is released to thereby return the sealing water flow to the flow channel 24. As the flow indicator ring 56 and float 46 are urged toward the left end 33 of the flow tube 27 by the sealing water flow, the cleaning ring 52 and the flow indicator ring 56 again scrape along the inner side wall 29 of the flow tube. This ensures the complete removal of dirt and debris from the inner side wall. The sealing water flow washes the removed dirt and debris out the outlet channel 58, clearing the dirt and debris from the flowmeter 10.

While this invention has been described in detail in a preferred embodiment, it will be understood by those skilled in the art that numerous changes and modifications may be made thereto without departure from the spirit and scope of the invention as set forth in the following claims.

I claim:

1. In a variable area flowmeter for measuring the rate of flow of a medium and which includes a housing, a flow tube having an inner wall, first and second ends and a scale printed thereon mounted within the housing and through which the medium flows, an inlet means for delivering the medium flow to the flow tube, and an outlet means for enabling the medium flow to flow out of the flow tube, the improvement therein comprising:
   a movable float mounted within the flow tube in frictional contact with the inner wall of the flow tube and movable along the length of the flow tube between the first and second ends thereof;
   an adjustable metering member having a fixed end and a distal end with said fixed end attached to the housing adjacent the first end of the flow tube said member extending along the length of the flow tube toward the second end thereof and with said distal end positioned intermediate the first and second ends of the flow tube, said metering member supporting said float as said float moves between the first and second ends of the flow tube;

a flow indicator ring for indicating the rate of flow of the medium positioned within the flow tube between said distal end of said metering member and the second end of the flow tube, said flow indicator ring being freely movable between said distal end of said metering member and the second end of the flow tube; and a means for biasing said float along the length of the flow tube toward the second end, positioned between said float and the first end of the flow tube.

2. The improvement as claimed in claim 1 and further including a cleaning ring attached to the front of said float and having an aperture formed therein through which said metering member extends and through which the medium flow passes, said cleaning ring engaging the inner wall of the flow tube in scraping contact to thereby clean the inner wall of the flow tube as said float moves along the length of the flow tube.

3. The improvement as claimed in claim 1 and wherein said means for biasing said float along the length of the flow tube comprises a compression spring.

4. The improvement as claimed in claim 1 and further including a bypass channel extending through the housing and linking the inlet means to the outlet means, and a bypass valve for diverting the medium flow from the inlet means along the bypass channel to the outlet means so as to enable the medium flow to pass through the flowmeter without passing through said flow tube.

5. The improvement as claimed in claim 2 and wherein said metering member comprises a substantially cylindrical rod having a flat surface formed thereon which tapers inwardly from said distal end of said metering member to form a semi-cylindrically shaped portion which extends through said aperture in said cleaning ring such that as said metering member is adjusted, said aperture is closed and opened so as to vary the amount of the medium flow through said float to thereby adjust said float to a zero position.

6. A variable area flow meter for measuring the rate of flow of a cooling and lubricating fluid to a sealed bearing comprising:

a flowmeter housing;

a flow tube mounted in said housing, having an inner side wall, first and second ends and a scale printed thereon and through which the fluid flow passes;

an inlet channel formed in said housing and opening into said second end of said flow tube for delivering the medium flow to said flow tube;

a float mounted in said flow tube in frictional engagement with said inner side wall of said flow tube and movable along the length of said flow tube in response to the fluid flow;

a metering member positioned within said flow tube and having a fixed end and a distal end with said fixed end attached to an adjustment means at said first end of said flow tube, said metering member extending along the length of said flow tube such that said distal end is positioned intermediate said first and second ends of said flow tube;

said metering member being adjustable along the length of said flow tube and supports said float as said float moves along the length of said flow tube;

a flow indicator ring positioned within said flow tube between said distal end of said metering member and said second end of said flow tube and freely movable between said distal end of said metering member and said second end of said flow tube for indicating the rate of the medium flow through said flow tube; and an outlet channel formed in said housing and linked to said flow tube at said first end of said flow tube for directing the medium flow out of said flow tube.

7. The apparatus as claimed in claim 6 and further including a means for biasing said float along the length of said flow tube against the force of the medium flow, positioned between said float and said first end of said flow tube.

8. The apparatus as claimed in claim 7 and wherein said means for biasing said float along the length of said flow tube comprises a compression spring.

9. The apparatus of claim 6 and further including a cleaning ring attached to the front of said float and having an aperture formed therein through which said metering member extends and through which the medium flow passes, said cleaning ring engaging said inner wall of said flow tube in scraping contact to thereby clean said inner wall of said flow tube said float moves along the length of said flow tube.

10. The apparatus of claim 9 and wherein said metering member comprises a substantially cylindrical rod having a flat surface formed thereon which tapers inwardly from said distal end of said metering member to form a semi-cylindrically shaped portion which extends through said aperture in said cleaning ring such that as said metering member is adjusted, said aperture is narrowed and opened so as to vary the amount of the medium flow through said float to thereby adjust said float to a zero position.

11. The apparatus of claim 6 and further including a bypass channel extending through said housing and linking said inlet channel to said outlet channel, and a bypass valve for diverting the medium flow from said inlet channel along said bypass channel to said outlet channel so as to enable the medium flow to pass through the flowmeter without passing through said flow tube.

* * * * *